US012801109B2

(12) United States Patent
Gupta et al.

(10) Patent No.: US 12,801,109 B2
(45) Date of Patent: Nov. 17, 2026

(54) ELECTRIC GRID MODEL ERROR REDUCTION

(71) Applicant: X Development LLC, Mountain View, CA (US)

(72) Inventors: Ananya Gupta, San Francisco, CA (US); Phillip Ellsworth Stahlfeld, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 1105 days.

(21) Appl. No.: 17/687,823

(22) Filed: Mar. 7, 2022

(65) Prior Publication Data

US 2023/0280712 A1 Sep. 7, 2023

(51) Int. Cl.

*G06F 30/20* (2020.01)
*G05B 19/042* (2006.01)
*G06F 16/901* (2019.01)
*G06F 113/04* (2020.01)

(52) U.S. Cl.

CPC ..... *G05B 19/0428* (2013.01); *G06F 16/9024* (2019.01); *G06F 30/20* (2020.01); *G06F 2113/04* (2020.01)

(58) Field of Classification Search

CPC . G05B 19/0428; G06F 16/9024; G06F 30/20; G06F 2113/04; G06F 30/12; G06F 2119/06; G06F 30/18; H02J 2203/20
USPC ...................................................... 703/13–15
See application file for complete search history.

(56) References Cited

U.S. PATENT DOCUMENTS 7,860,702 B1 12/2010 Evans et al.
7,945,524 B2 5/2011 Anderson et al.
8,751,421 B2 6/2014 Anderson et al.
8,924,033 B2 12/2014 Goutard et al.
9,846,839 B2 12/2017 Nasle et al.
(Continued)

FOREIGN PATENT DOCUMENTS

WO WO 2017/100916 6/2017

OTHER PUBLICATIONS

International Search Report and Written Opinion in International Appln. No. PCT/US2023/014448, dated Jun. 13, 2023, 13 pages.
(Continued)

*Primary Examiner* — Juan C Ochoa
(74) *Attorney, Agent, or Firm* — Fish & Richardson P.C.

(57) ABSTRACT

Methods, systems, and apparatus, including computer programs encoded on a storage device, for electric grid model error reduction are enclosed. A method includes obtaining graph data defining a graph including nodes and edges. Each node represents a component of an electric grid and is associated with respective node data representing electrical properties of the component of the electric grid, each edge represents a connection between components of the electric grid and is associated with respective edge data representing electrical properties of the connection, and the graph data includes one or more errors, each error including erroneous node data or erroneous edge data. The method includes processing the graph data using an error-correcting model trained to correct errors in the graph data; obtaining, as output from the error-correcting model, output graph data; and verifying accuracy of the output graph data by processing the output graph data using an electric grid simulator.

20 Claims, 5 Drawing Sheets

(56) References Cited

U.S. PATENT DOCUMENTS

| | | | | |
|---|---|---|---|---|
| 10,444,806 | B2 | 10/2019 | Brockman et al. | |
| 11,068,634 | B2 | 7/2021 | Enenkel et al. | |
| 11,921,163 | B2 * | 3/2024 | Negoita | G01R 31/396 |
| 12,068,602 | B2 * | 8/2024 | Ratnayake | G05B 19/042 |
| 2012/0029897 | A1 | 2/2012 | Cherian et al. | |
| 2012/0089384 | A1 | 4/2012 | Coyne et al. | |
| 2013/0166270 | A1 | 6/2013 | Sun et al. | |
| 2017/0046458 | A1 * | 2/2017 | Meagher | G06F 30/20 |
| 2017/0092055 | A1 | 3/2017 | Brockman et al. | |
| 2017/0373535 | A1 | 12/2017 | Binh | |
| 2020/0043285 | A1 | 2/2020 | Brockman et al. | |
| 2021/0241126 | A1 | 8/2021 | Nasle et al. | |
| 2021/0406425 | A1 | 12/2021 | Francis et al. | |

OTHER PUBLICATIONS

Rudin et al., "Machine Learning for the New York City Power Grid," IEEE Transactions on Pattern Analysis and Machine Intelligence, 2012, 34(2):328-345.

International Preliminary Report on Patentability in International Appln. No. PCT/US2023/014448, dated Sep. 10, 2024, 8 pages.

* cited by examiner

ELECTRIC GRID MODEL ERROR REDUCTION

TECHNICAL FIELD

The present specification relates to electrical power distribution systems, and specifically to generating models of electrical power distribution systems.

BACKGROUND

Electrical power distribution systems, or electric grids, transmit electrical power to loads such as residential and commercial buildings. Various electric grid conditions can be simulated and visualized using electric grid models. Electric grid models are used to evaluate and predict operations and potential faults in an electric grid.

SUMMARY

In general, the present disclosure relates to a system for accurately modeling electric power grids. Electric grid models are used to evaluate and predict operations and potential faults in an electric grid. The present disclosure provides a system and method to reduce errors in electric power grid data representing electrical properties of components of electric grids and of connections between the components. The disclosed methods can be used to train an error-correcting model to correct errors in electric grid model graphs.

An electric grid model graph can include nodes representing electrical components such as electric buses, and edges representing connections between the components. In some examples, an edge can be associated with a binary signal, where each bit of the binary signal represents a phase of an electrical connection represented by the edge. In some examples, a graph represents a feeder of the electric grid and any equipment connected to the feeder. The trained error-correcting model can process incomplete or inaccurate grid model graphs, and output more accurate graphs for use in electric grid modeling and simulation.

To train an error-correcting model, a set of modified grid model graphs can be generated by adding random noise to ground truth grid model graph data. Due to adding the noise, the modified graphs include errors. An error can be, for example, an error in a binary signal associated with an edge of the graph. The error-correcting model receives the modified graphs as input and generates corresponding output graphs. The output graphs can then be compared to the ground truth grid model graphs. Parameters of the error-correcting model can be adjusted based on comparing the output graphs to the ground truth grid model graphs. Thus, the error-correcting model can be trained to correct errors in electric grid model graphs. The error-correcting model can be, for example, a machine learning model such as an autoencoder model.

A trained error-correcting model can be used for inference to correct errors in grid model graph data. The trained error-correcting model receives, as input, a grid model graph that represents a portion of an electric grid such as a feeder of an electric grid. In some examples, the trained error-correcting model receives, as input, an error report indicating edges of the grid model graph where errors have been detected. The error report can be generated, for example, by an electric grid simulator configured to simulate operations of the electric grid. In some examples, the trained error-correcting model receives, as input, grid model graph data in which erroneous data has been replaced or removed (e.g., zeroed out), such that there are gaps in the grid model data where the errors were detected by the electric grid simulator.

The error-correcting model can process the input grid model graph, the error report, or both, and produce output graph data representing an updated grid model graph of the portion of the electric grid. The output graph data can then be processed by the electric grid simulator to verify correction of the errors. The disclosed techniques can be used to correct various types of errors in electric grid graph data. For example, errors can include discontinuities in electrical phase connections, voltage mismatches, single-phase connections connecting to three-phase connections, dead-end connections, and phase islands.

In general, innovative aspects of the subject matter described in this specification can be embodied in an electric grid model error-correcting method including actions of obtaining graph data defining a graph including nodes and edges between nodes. Each node represents a component of an electric grid and is associated with respective node data representing electrical properties of the component of the electric grid. Each edge represents a connection between components of the electric grid and is associated with respective edge data representing electrical properties of the connection. The graph data includes one or more errors, each error including erroneous node data or erroneous edge data. The actions include processing the graph data using an error-correcting model trained to correct errors in the graph data; obtaining, as output from the error-correcting model, output graph data; and verifying accuracy of the output graph data by processing the output graph data using an electric grid simulator.

These and other aspects can each optionally include one or more of the following features. In some implementations, the actions include, prior to obtaining the graph data, processing the graph data using the electric grid simulator to obtain simulation results for the graph data; identifying the one or more errors based on the simulation results; and replacing the erroneous edge data and the erroneous node data with replacement values.

In some implementations, the actions include, prior to obtaining the graph data, processing the graph data using the electric grid simulator to obtain simulation results for the graph data; identifying the one or more errors based on the simulation results; and appending the erroneous edge data and the erroneous node data with flag values.

In some implementations, the actions include, prior to obtaining the graph data, processing the graph data using the electric grid simulator to obtain simulation results for the graph data; obtaining a first error report indicating edges and nodes where the one or more errors are detected in the simulation results for the graph data; and processing the graph data and the first error report using the error-correcting model to obtain the output graph data.

In some implementations, verifying the accuracy of the output graph data includes: obtaining a second error report indicating edges and nodes where errors are detected in simulation results for the output graph data; and comparing the second error report to the first error report.

In some implementations, comparing the second error report to the first error report includes: identifying an edge or node indicated by the first error report as including an error; and determining that the identified edge or node does not include an error in the second error report.

In some implementations, verifying the accuracy of the output graph data includes: determining that a difference between a number of errors indicated by the second error report and a number of errors indicated by the first error report is a threshold difference or greater.

In some implementations, verifying the accuracy of the output graph data includes: obtaining an error report indicating edges and nodes where errors are detected in simulation results for the output graph data; and determining that a number of errors indicated by the error report is a threshold number of errors or less.

In some implementations, obtaining the graph data includes: obtaining a set of graphs from a database; processing each graph of the set of graphs using the electric grid simulator to obtain simulation results; identifying, based on the simulation results, a subset of graphs having failing simulation results; and obtaining graph data defining one of the subset of graphs having failing simulation results.

In some implementations, each edge is associated with a binary signal, each bit of the binary signal representing a phase of the connection represented by the edge.

In some implementations, the one or more errors include discontinuities in at least one of the node data or the edge data.

In some implementations, the graph represents a portion of the electric grid.

In some implementations, the portion of the electric grid includes a feeder of the electric grid.

In some implementations, an error of the one or more errors includes one of a phase island, a voltage mismatch, a missing substation, a missing primary voltage, or a missing secondary voltage.

In some implementations, a phase island includes one of a dead phase, a single-phase island, or a three-phase island.

In some implementations, a dead phase includes a phase for which no path of the graph data connects the phase to an electric grid substation.

In some implementations, the error-correcting model includes a graph neural network model.

In general, innovative aspects of the subject matter described in this specification can be embodied in an electric grid model error-correcting method including actions of obtaining a set of graphs. Each graph of the set of graphs includes nodes and edges between nodes. Each node represents a component of an electric grid and is associated with respective node data representing electrical properties of the component of the electric grid. Each edge represents a connection between components of the electric grid and is associated with respective edge data representing electrical properties of the connection. The actions include generating, from the set of graphs, modified graphs by introducing errors in the set of graphs; processing each of the modified graphs with an error-correcting model to obtain a corresponding output of the error-correcting model; and adjusting parameters of the error-correcting model based on comparing the output from the error-correcting model to the set of graphs.

These and other aspects can each optionally include one or more of the following features. In some implementations, introducing errors in the set of graphs includes adding noise to at least one of the node data or the edge data.

In some implementations, the error-correcting model includes a graph neural network model, and the set of graphs include a set of ground truth graphs each representing a portion of an electric grid.

The subject matter described in this specification can be implemented in various embodiments and may result in one or more of the following technical advantages. The disclosed processes can be used to reduce errors in electric grid models. Machine learning models including graph neural networks (GraphNets) can leverage knowledge about the graph, based on neighboring edges and nodes of the graph, to rapidly identify and fix errors and data gaps. The trained model can be scaled and used to fix errors in any electric grid graphs.

Other implementations of the above aspects include corresponding systems, apparatus, and computer programs, configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference numbers and designations in the various drawings indicate like elements.

DETAILED DESCRIPTION

In general, the present disclosure relates to a system for accurately modeling electric power grids. Electric grid models are used to evaluate and predict operations and potential faults in an electric grid. The present disclosure provides a system and method to reduce errors in electric power grid data representing electrical properties of components of electric grids and of connections between the components. The disclosed methods can be used to train an error-correcting model to correct errors in electric grid model graphs.

Figure 1:
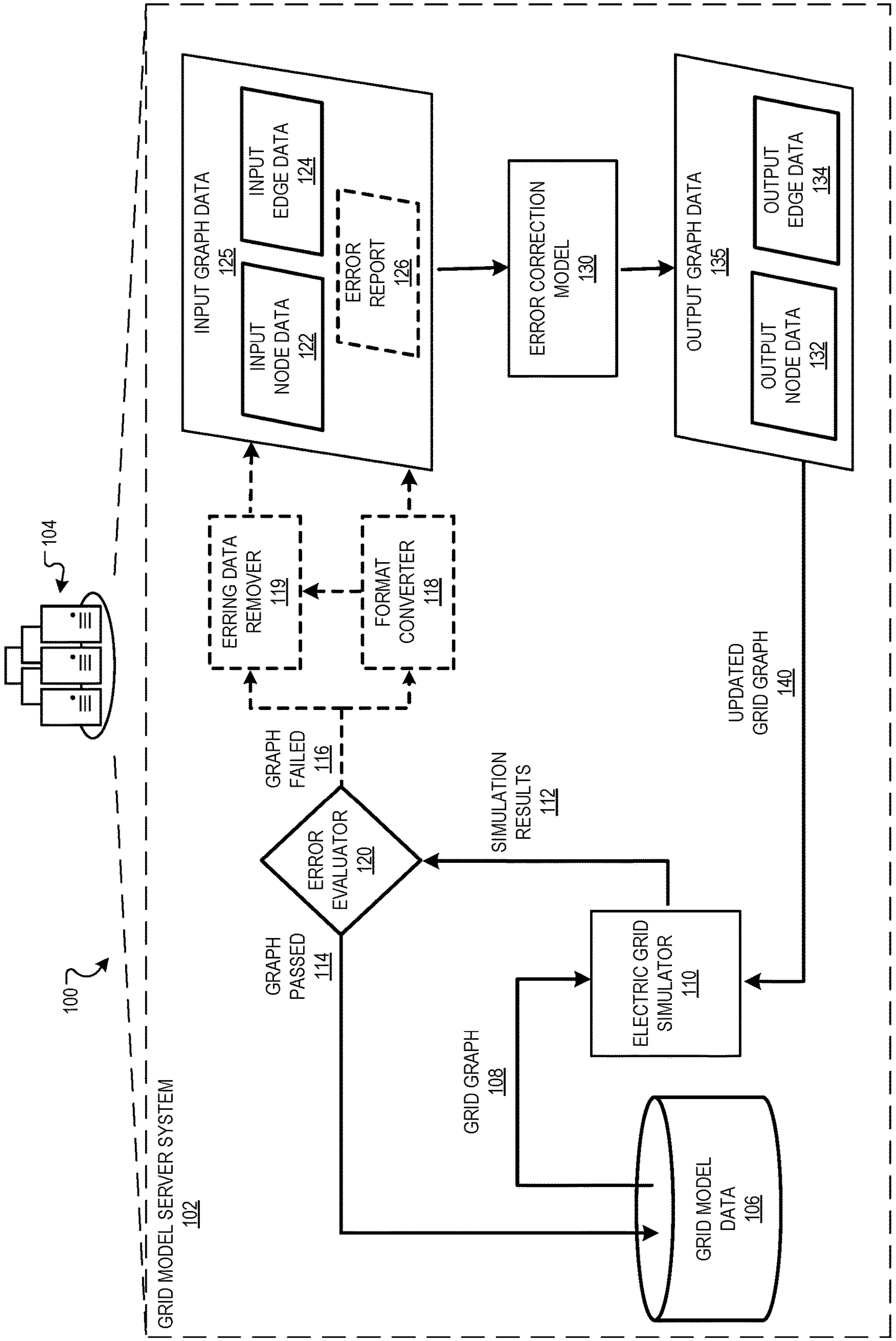
FIG. 1 is a diagram of an example system for electric grid modeling.
Figure 3:
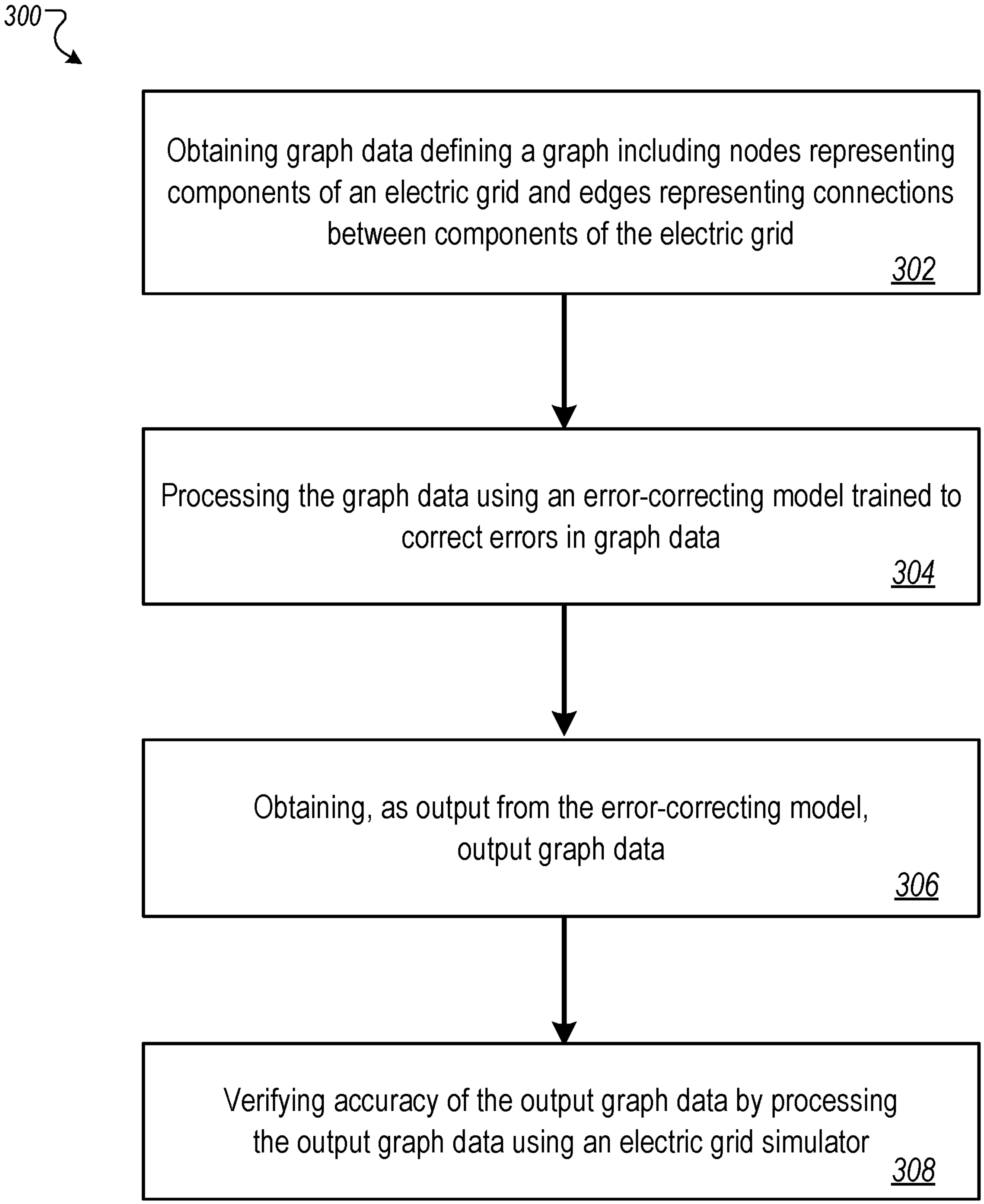
FIG. 3 is a flow diagram of an example process for reducing errors in an electric grid model.

FIG. 1 is a diagram of an example system 100 for electric grid modeling. The system 100 can be used to perform a process 300 for reducing errors in an electric grid model. A flow diagram of the process 300 is illustrated in FIG. 3.

The system 100 includes a grid model server system 102. The server system 102 may be hosted within a data center 104, which can be a distributed computing system having many (e.g., tens, hundreds, or thousands) of computers in one or more locations. The server system 102 includes a database of grid model data 106, an electric grid simulator 110, and an error correction model 130. The error correction model 130 is trained to reduce errors in the grid model data 106. The server system 102 also includes an error evaluator 120. The server system 102 can optionally include an erring data remover 119, a format converter 118, or both. Optional features are represented in FIG. 1 as having dashed outlines. In some examples, the error evaluator 120, the erring data remover 119, or both can process grid model data 106 before the grid model is provided to the error correction model.

The electric grid model data 106 can include virtual representations of components of an electric grid located within a geographic region. The geographic region can include, for example, an area of hundreds of square meters, several square kilometers, hundreds of square kilometers, or thousands of square kilometers. The geographic region can correspond to a location of an electrical distribution feeder or multiple feeders. In some cases, the geographic region can correspond to a location of a bulk power system within and throughout, e.g., a state, county, province, or country.

The grid model data 106 can include a high resolution model of one or more electrical distribution feeders. The grid model data 106 can include, for example, data models of substation transformers, medium voltage distribution lines, distribution switches and reclosers, capacitors, voltage regulation schemes, e.g., tapped magnetics or switched capacitors, network transformers, load transformers, inverters, generators, and various loads. The grid model data 106 can also include transformer locations and capacities, feeder locations and capacities, and load locations.

Electrical grid models include graph data. The graph data can be separated into individual graphs, where a graph represents a portion of the electric grid such as a feeder. In some examples, the portion of the electric grid is a portion located within a geographic area. The geographic area can be, for example, a square mile, five square miles, ten acres, etc.

The graph data includes node data defining nodes of the graph, and edge data defining edges of the graph. Nodes and edges of the graph represent physical components of the electric grid, such as transformers, capacitors, voltage regulators, and wires. The node data and edge data can represent electrical properties of the components. Electrical properties include, e.g., phasing, ratings, and impedance. The node data and edge data can also represent a classification of the asset represented by the node or edge. For example, node and edge data for a set of nodes and edges representing a transformer can specify that the set of nodes and edges represents a transformer. The electrical properties represented by the node data and the edge data can be used to simulate the electrical behavior of grid models. Inaccuracies in data representing electrical properties can lead to inaccurate simulation results.

The electrical properties of components of an electric grid can be estimated using various methods, such as based on physical and electrical measurements and using computer vision methods. Estimated electrical property data can include missing or erroneous data. For example, electrical properties of inaccessible or difficult to access locations may be inaccurate or missing.

In electric grid graphs, buses can be modeled as nodes, and connections between buses can be modeled as edges. Electrical components with two terminals, e.g., wires, switches, transformers and voltage regulators, can also be modeled as edges between nodes. Properties of the nodes and edges represent characteristics of the components. For example, a length of an edge of the graph may correspond to a length of a wire.

In some examples, each edge of a graph is associated with a binary signal. Each bit of the binary signal can represent a phase of the connection represented by the edge. For example, a binary signal can be of a format [A B C N] representing an A-phase, B-phase, C-phase, and neutral phase of an electrical distribution system. As an example, a three-phase line can be represented by a binary signal of [1 1 1 0] or [1 1 1 1]. A single-phase line can be represented by a binary signal of [1 0 0 1] for phase A, [0 1 0 1] for phase B, and [0 0 1 1] for phase C.

The process 300 includes obtaining graph data defining a graph including nodes representing components of an electric grid and edges representing connections between components of the electric grid (302). For example, a grid graph 108 can be retrieved from the grid model data 106 for electrical grid simulation using the electric grid simulator 110. The grid graph 108 can include graph data that represents a feeder of the electric grid including equipment connected to the feeder. The electric grid simulator 110 processes the grid graph 108 to obtain simulation results 112. To process the grid graph 108, the electric grid simulator 110 uses the grid graph 108 to perform a simulation of electric grid operations of the feeder represented by the grid graph 108.

In some examples, the electric grid simulator 110 performs an electrical grid simulation using multiple grid graphs 108 representing multiple feeders. In some examples, the electric grid simulator 110 performs an electric grid simulation using all of the grid model data 106, e.g., grid model data representing an entire electric grid.

The electric grid simulator 110 outputs simulation results 112. Simulation results 112 can include, for example, time-varying values of electrical characteristics of the electric grid under simulated operating conditions. In some examples, the simulation results 112 can indicate any errors that occurred during simulation. Errors can prevent the electric grid simulator 110 from producing complete simulation results 112. In some examples, errors in the grid graph 108 can cause the electric grid simulator 110 to be unable to solve a simulation using the grid graph 108. An error may occur, for example, when the electric grid simulator 110 is unable to obtain simulation results for particular edges and nodes due to the edge data and/or node data being electrically invalid.

The simulation results 112 can be evaluated by an error evaluator 120. The error evaluator 120 can determine whether the grid graph 108 passed 114 or failed 116 simulation by the electric grid simulator 110. When the simulation results 112 include results for multiple grid graphs 108, the error evaluator 120 can identify a subset of graphs that passed 114, and a subset of graphs that failed 116. A passing graph can be a graph for which no errors occurred during simulation. A failing graph can be a graph for which at least one error occurred during simulation.

The simulation results 112 can indicate various types of errors. In general, errors can be caused by missing data, incorrect data, mismatched data, data discontinuities, or any of these.

An example error in the grid graph 108 is phase islanding. A phase island can be a region of the graph in which a phase does not connect to an adjacent. For example, a first edge of the grid graph 108 may be three phase, and a connected second edge may be single phase, such that two of the three phases of the first edge do not have a path to a substation of the electric grid. The phases that do not connect to the substation can be classified a "islanded." In some examples, assets such as fuses and transformers, represented by two nodes and a connecting edge, can cause phase islands. For example, an asset may be disconnected from other nodes and edges in the grid graph 108.

An example error in the grid graph 108 is a dead phase. A dead phase can be a phase for which no path of the graph data connects the phase to a substation. For example, a dead phase can include edges that do not connect to any node that connects to a substation. A dead phase can be considered a type of phase islanding.

An example error in the grid graph 108 is a missing substation or a substation that is farther away from a node than heuristic limits. For example, the electric grid simulator 110 can process the grid graph 108 against heuristic limits establishing a maximum distance away from a substation for any node. A node that has a distance from a nearest substation that is greater than the maximum distance can result in an error during simulation.

An example error in the grid graph 108 is a transformer with no primary voltage or a transformer with no secondary voltage. For example, a transformer can be represented in the grid graph 108 as a primary node, a secondary node, and an edge connecting the primary and secondary nodes. Node properties for the primary node and the secondary node can represent the primary and secondary voltages, respectively. In some examples, a primary node and/or secondary node may be missing node properties representing voltage. The missing voltage or voltages can result in an error during simulation.

An example error in the grid graph 108 is a nominal voltage error or a voltage mismatch. For example, node data and edge data can include properties representing voltages of the respective components. Nodes and edges that are connected and that have mismatched voltages can result in an error during simulation.

The error evaluator 120 evaluates the simulation results 112 to determine whether the grid graph 108 passed 114 or failed 116 simulation. In an example scenario, the error evaluator 120 determines that the grid graph 108 failed simulation. In response to determining that the grid graph 108 failed simulation, the grid graph 108 can be prepared for processing. To prepare the grid graph 108 for processing, the grid graph 108 can be processed by the format converter 118, the erring data remover 119, or both.

In some implementations, the format converter 118 receives graph data defining one of the subset of graphs having failed 116 simulation. The format converter 118 processes the grid graph 108 by converting the grid graph 108 to a format appropriate for processing by the error correction model 130. For example, the format converter 118 can convert the grid graph 108 from GridGraph format to a Graph Tensor format. In some implementations, the format converter 118 can be bypassed. For example, the grid graph 108 may already be in a format that is able to be processed by the error correction model 130. In these cases, the format converter 118 can be bypassed, and the failed graph can be processed by the erring data remover 119 or can be used directly as input graph data 125.

In some implementations, the erring data remover 119 receives graph data defining one of the subset of graphs having failed 116 simulation. The erring data remover 119 can receive the graph data, e.g., representing grid graph 108, from the error evaluator 120 or from the format converter 118.

The erring data remover 119 identifies locations of the errors in the grid graph 108. For example, the erring data remover 119 can identify nodes and edges of the grid graph 108 where errors occurred during simulation. The erring data remover 119 can remove, replace, or append the erroneous node data and the erroneous edge data from the grid graph 108. In some examples, the erring data remover 119 can replace or append the erroneous node data and the erroneous edge data with flag values (e.g., signal values or sentinel values). The flag values can provide the error correction model with an indication of locations of errors in the grid graph 108.

As an example, the erring data remover 119 can identify edges that are marked as phase islands, and can replace the phase data for the edge with replacement values. In some examples, the replacement values are zero. For example, for an edge having a phase signal of [1 1 1 0], the erring data remover 119 can zero out the phase data such that the phase signal for the edge becomes [0 0 0 0]. In addition to or instead of phase data, the erring data remover 119 can replace, or zero out, data representing electrical properties such as length, impedance, voltage, and/or resistance. By zeroing out the data, the erring data remover 119 creates data gaps to be filled in by the error correction model 130. The zeroed-out values can function as an in-band flag signal that provides, to the error correction model 130, an indication of locations of errors in the grid graph 108.

In some examples, the erring data remover 119 can provide an out-of-band signal to the error correction model 130 to indicate locations of errors in the grid graph 108. The out-of-band signal can include, for example, a binary flag value for each edge and node of the grid graph 108. The binary flag value for a particular edge or node can indicate whether or not an error was detected at the particular edge or node (e.g., a value of one representing a detected error, and a value of zero representing no error detected). In these examples, the input node data 122, the input edge data 124, or both, can be appended with respective binary flag values indicating locations of errors.

In some implementations, the erring data remover 119 can be bypassed. For example, the error correction model 130 may be trained to process graph data that does not have zeroed out data. In these cases, the erring data remover 119 can be bypassed, and the grid graph 108 or reformatted grid graph can be used directly as input graph data 125.

The input graph data 125 includes input node data 122 representing electrical properties of components of the electric grid, and input edge data 124 representing electrical properties of connections between the components. The input graph data 125 can optionally include an error report 126. The error report 126 can indicate locations of errors within the simulation results 112. For example, the error report 126 can indicate nodes and edges where errors occurred during simulation.

Figure 2A:
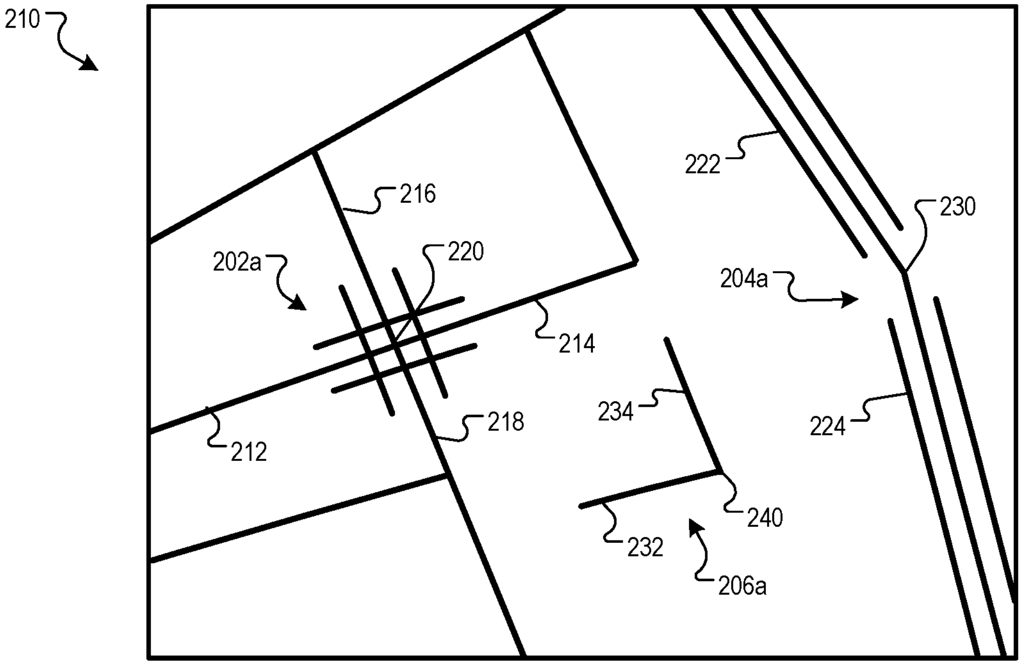
FIG. 2A illustrates an example graph of electric grid components for input to an error-correcting model.

FIG. 2A illustrates an example graph 210 of electric grid components for input to an error-correcting model. The graph 210 includes regions 202*a*, 204*a*, and 206*a*.

Region 202*a* is a three-phase island. Region 202*a* includes a node 220 at an intersection of four edges. The incoming edges 212, 214, 216, 218 are single-phase, each shown in the graph 210 as a single line. The node 220 is three-phase. When input to the electric grid simulator 110, the graph 210 will likely result in a simulation error due to the phase discontinuity between the node 220 and the edges 212, 214, 216, 218.

Region 204*a* is a single-phase island. Region 204*a* includes a node 230 at an intersection of two edges. The incoming edges 222, 224 are three-phase, each shown in the graph 210 as three parallel lines. The node 230 is single phase. When input to the electric grid simulator 110, the graph 210 will likely result in a simulation error due to the discontinuity between the node 230 and the edges 222, 224.

Region 206*a* is a dead phase. Region 206*a* includes a node 240 at an intersection of two edges 232, 234. Neither edge 232 nor edge 234 connects to another node or edge of the graph 210. Thus, node 240 does not connect to any substation of the grid. When input to the electric grid simulator 110, the graph 210 will likely result in a simulation error due to node 240 not connecting to any substation.

In some examples, the graph 210 can be input to the error correction model 130 with the erring data present. For example, the input node data 122 and input edge data 124 may include the erroneous node data and erroneous edge data corresponding to the regions 202*a*, 204*a*, and 206*a*.

In some examples, the graph 210 can be input to the error correction model 130 with the erring data removed. For example, the input node data 122 and the input edge data 124 may be pre-processed by the erring data remover 119. The erring data remover 119 can remove the erroneous node data and erroneous edge data by setting the respective data values to zero.

In some examples, the graph 210 and a corresponding error report can be input to the error correction model 130. For example, an error report 126 can be generated from the simulation results 112. The error report 126 can indicate locations of the graph 210 where errors occurred during simulation. For example, the error report 126 may indicate that regions 202*a*, 204*a*, and 206*a* caused errors during simulation. In some examples, the error report 126 can indicate a type of error that occurred at each region, e.g., three-phase islanding, single-phase islanding, or dead phase.

The process 300 includes processing the graph data using an error-correcting model trained to correct errors in graph data (304). For example, the error correction model 130 can be used for inference to reduce errors in incomplete or inaccurate graphs representing the components of the electric grid. The error correction model 130 processes the input graph data 125 by filling in data gaps and replacing erroneous node and edge data with updated node and edge data. The error correction model 130 generates output graph data 135, which includes the updated node and edge data. The error correction model 130 can be, for example, a machine learning model such as a convolutional neural network model, e.g., an autoencoder model. In some examples, the error correction model 130 is a graph neural network model.

A graph neural network can be implemented to model network dynamics and information propagation. In a graph neural network, a message passing algorithm is executed where the messages and their effect on edge and node states are learned by neural networks. A single model can therefore be trained using a sampled set of graphs, and can be deployed at scale. Graph neural networks extend the learning bias imposed by convolutional neural networks and recurrent neural networks by evaluating nodes and edges based on their proximity to other nodes and edges. This allows for arbitrarily complex connections to determine effects of node data and edge data on adjacent nodes and intersecting edges. In a graph neural network, adjacent nodes pass messages to each other. Using this structure, a locality bias is imposed where nodes rely on adjacent nodes, through one message-passing step. These mechanisms enable graph neural networks to capitalize on the connectivity structure of the interconnected electric grid. The error correction model 130 processes the input graph data 125 to infer electrical properties of the components of the electric grid.

The process 300 includes obtaining, as output from the error-correcting model, output graph data (306). For example, the error correction model 130 processes the input graph data 125 and produces, as output, output graph data 135. The output graph data 135 includes output node data 132 and output edge data 134. Referring to FIG. 2, the error correction model 130 can process the input graph 210 and produce, as output, output graph 250.

Figure 2B:
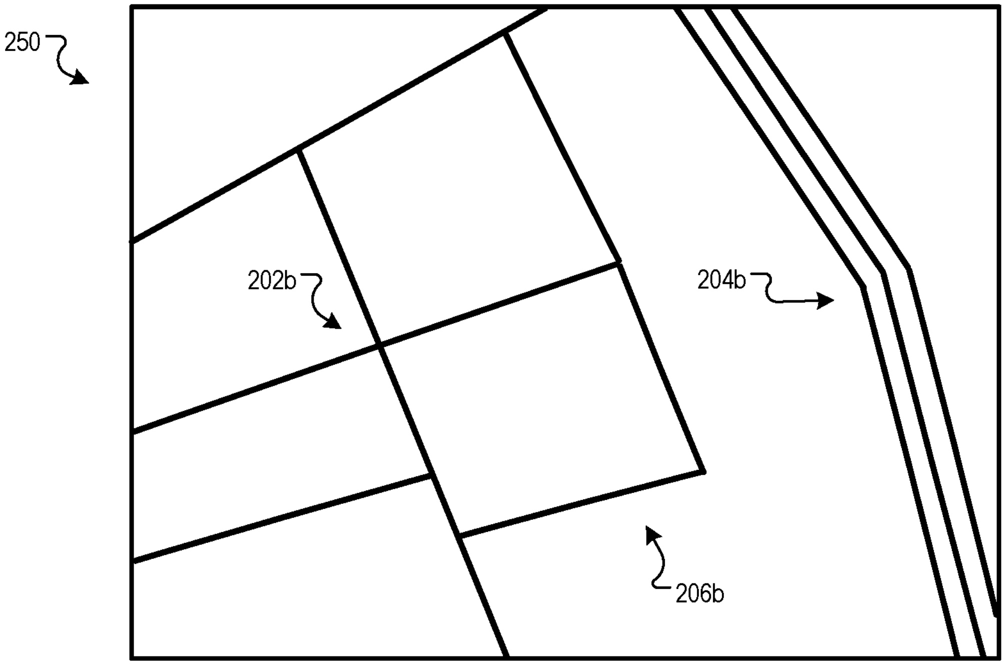
FIG. 2B illustrates an example graph of electric grid components output from an error-correcting model.

FIG. 2B illustrates an example graph 250 of electric grid components output from an error-correcting model. The graph 250 includes regions 202*b*, 204*b*, and 206*b* that correspond to the regions 202*a*, 204*a*, 206*a* of the graph 210.

In the graph 250, the errors of the graph 210 have been corrected. Specifically, region 202*b* is a continuous single-phase intersection that replaces the three-phase island of the region 202*a*. Region 204*b* is a continuous three-phase intersection that replaces the single-phase island of region 204*a*. Region 206*b* is connected to adjacent nodes of the graph 250, and replaces the dead phase of region 206*a*.

The process 300 includes verifying accuracy of the output graph data by processing the output graph data using an electric grid simulator (308). For example, an updated grid graph 140 including the output graph data 135 can be provided to the electric grid simulator 110. The updated grid graph 140 can be, for example, the graph 250 of FIG. 2.

The electric grid simulator 110 performs a simulation using the updated grid graph 140 and generates simulation results 112. In some examples, the grid model data 106 can first be updated with the updated grid graph 140, and the electric grid simulator 110 can then perform a simulation using the updated grid model data 106. To update the grid model data 106, erroneous node data and erroneous edge data from the grid graph 108 can be replaced with the output node data 132 and the output edge data 134, respectively. For example, for any nodes that were previously part of phase islands, the phases can be updated to the phases predicted by the error correction model 130.

In some examples, in addition to or instead of processing the output graph data 135 with the electric grid simulator 110, the output graph data 135 can be evaluated using electrical validity checks. Electrical validity checks can be performed, for example, to verify that all phases connect to a substation, to check for dead phases, and to check for phases that form a loop.

The error evaluator 120 evaluates the simulation results 112 to determine if the updated grid graph 140 passes 114 or fails 116. In some examples, to evaluate the simulation results 112, the error evaluator 120 can obtain a second error report indicating edges and nodes where errors are detected in simulation results for the updated grid graph 140, and can compare the second error report with the error report for the grid graph 108. The error evaluator 120 can determine whether a difference between a number of errors indicated by the second error report and a number of errors indicated by the first error report is a threshold difference or greater. The threshold difference can be, for example, a reduction in errors by one error or greater, a reduction to zero errors, a reduction in errors by at least fifty percent, or a reduction in errors by one hundred percent.

In some examples, the error evaluator 120 can compare the second error report for the grid graph 140 with the error report for the grid graph 108 by determining whether specific errors in the error report for the grid graph 108 were corrected in the second error report. For example, the error evaluator 120 can identify an edge or node indicated by the first error report as including an error, and determine whether the identified edge or node does not include an error in the second error report. If the identified edge or node does not include an error in the second error report, the grid graph 140 passes 114 the evaluation.

In some examples, the error evaluator 120 can determine whether a number of errors indicated by the second error report is a threshold number of errors or less. The threshold number of errors can be, for example, zero errors, one error, or two errors.

If the updated grid graph 140 passes 114, the updated grid graph 140 can be added to the grid model data 106. In some examples, the updated grid graph 140 replaces the grid graph 108 in the database of grid model data 106. Adding the updated grid graph 140 to the grid model data 106 can improve accuracy of the grid model data 106. For example, adding the updated grid graph 140 to the grid model data 106 can improve accuracy of monitoring and/or simulating electric grid operations using the grid model data 106.

Components of the server system 102 can be provided as one or more computer executable software modules or hardware modules. That is, some or all of the functions of components of server system 102 can be provided as a block of computer code, which upon execution by a processor, causes the processor to perform functions described below. Some or all of the functions of components of the server system 102 can be implemented in electronic circuitry, e.g., by individual computer systems (e.g., servers), processors, microcontrollers, a field programmable gate array (FPGA), or an application specific integrated circuit (ASIC).

Figure 4:
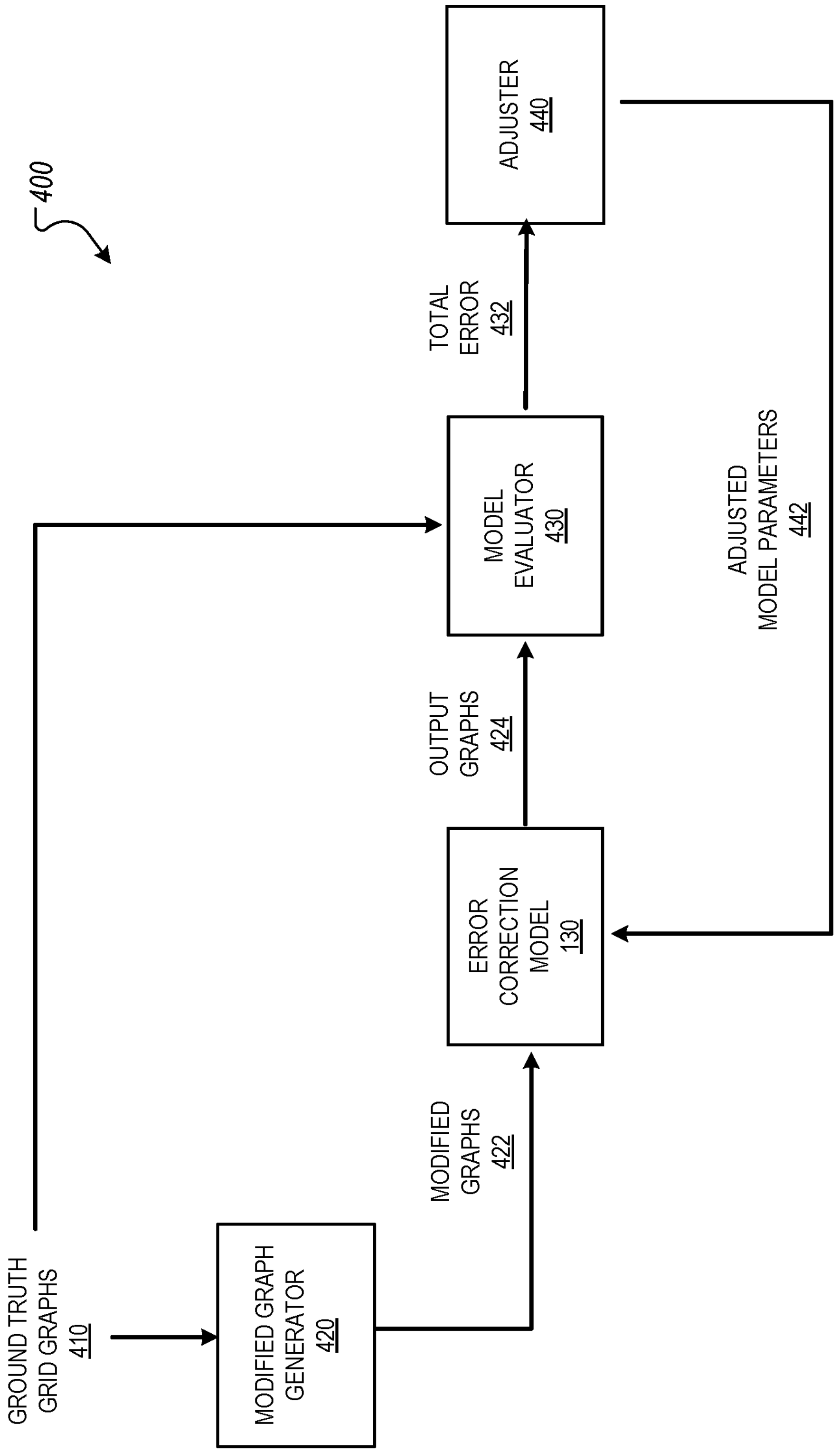
FIG. 4 is a diagram of an example system for training an error-correcting model of an electric grid modeling system.
Figure 5:
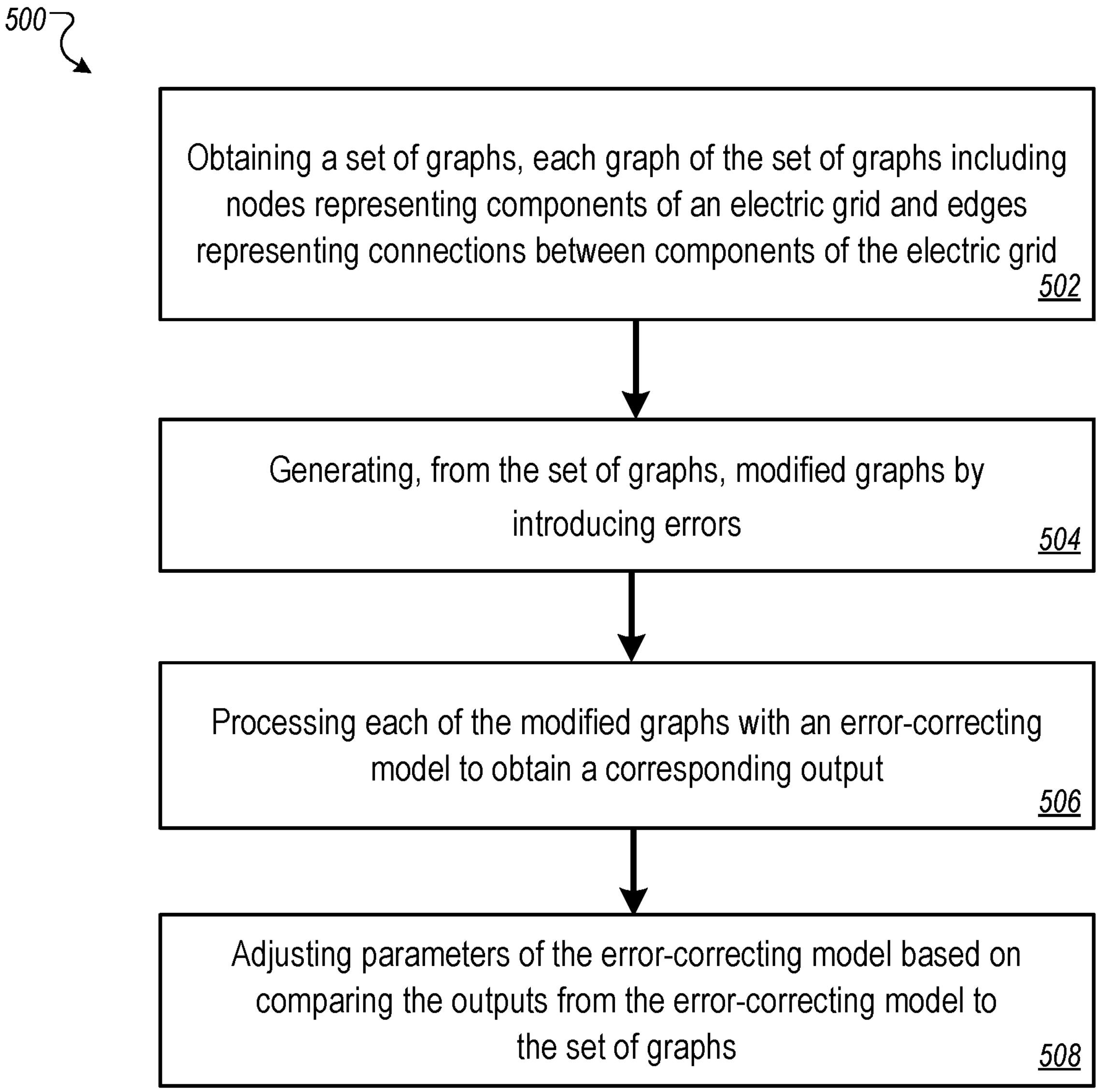
FIG. 5 is a flow diagram of an example process for training an error-correcting model.

FIG. 4 is a diagram of an example system 400 for training the error correction model 130 of the 100 electric grid modeling system. The system 400 can be used to perform a process 500 for training the error correction model 130. A flow diagram of the process 500 is illustrated in FIG. 5.

The system 400 includes a modified graph generator 420, the error correction model 130, a model evaluator 430, and an adjuster 440. The modified graph generator 420, the model evaluator 430, and the adjuster 440 can each be provided as one or more computer executable software modules or hardware modules. Some or all of the functions of modified graph generator 420, the model evaluator 430, and the adjuster 440 can be implemented in electronic circuitry, e.g., by individual computer systems (e.g., servers), processors, microcontrollers, an FPGA, or an ASIC.

The error correction model 130 can be trained using a supervised training process. The error correction model 130 can be trained using a set of ground truth graphs that represent locations of electric grid assets and connections over a geographic region. Electrical properties such as phasing, voltage, and conductor specifications are represented by properties of the ground truth grid graphs 410.

The process 500 includes obtaining a set of graphs, each graph of the set of graphs including nodes representing components of an electric grid and edges representing connections between components of the electric grid (502). For example, each graph of the set of graphs can be a ground truth grid graph 410. The set of graphs include a set of ground truth graphs, each representing a portion of an electric grid. In some examples, each feeder is represented by a single ground truth grid graph 410 and forms a single training example.

The process 500 includes generating, from the set of graphs, modified graphs by introducing errors (504). For example, the ground truth grid graphs 410 can be provided as input to a modified graph generator 420. The modified graph generator 420 can generate modified graphs 422 from the ground truth grid graphs 410. The modified graphs 422 can include the ground truth grid graphs 410 with perturbations added.

The modified graphs 422 can be generated by adding random noise to at least one of the node data or the edge data. The introduced errors can include discontinuities in at least one of the node data or the edge data.

As described above, phases can be represented as a binary signal with a format [A B C N] representing an A-phase, B-phase, C-phase, and neutral phase of an electrical distribution system. The bits of phase signals can be perturbed (e.g., flipped or shuffled) in order to introduce noise. In some examples, the modified graph generator 420 can introduce noise to a specified percentage of graph data. The specified percentage can be, for example, two percent or greater, or ninety percent or less. In some implementations, the specified percentage can be twenty percent, thirty percent, or fifty percent.

The process 500 includes processing each of the modified graphs with an error-correcting model to obtain a corresponding output (506). For example, the error correction model 130 can receive the modified graphs 422 as input and generate corresponding output graphs 424. The target of the error correction model 130 is to recreate the original properties of the ground truth grid graphs 410 graph on a per node/edge basis based on local graph neighborhood properties. To correct the graph data (e.g., node data and edge data) in the modified graphs 422, the error correction model 130 changes erroneous node data and erroneous edge data in the modified graphs 422 to match the node data and edge data of the ground truth grid graphs 410.

The output graphs 424 can include output node data that replaces erroneous node data, and output edge data that replaces erroneous edge data. The error-correcting model can be, for example, a machine learning model such as an autoencoder model or a graph neural network model. In some examples, the error correction model 130 can be trained as a graph denoising autoencoder.

The process 500 includes adjusting parameters of the error-correcting model based on comparing the outputs from the error-correcting model to the set of graphs (508). For example, the model evaluator 430 can compare the output graphs 424 to the ground truth grid graphs 410. The model evaluator 430 can determine a total error 432 between the output graphs 424 and the ground truth grid graphs 410.

The total error 432 between the output graphs 424 and the ground truth grid graphs 410 can include different types of errors. A successful correction occurs when graph data in the modified graphs 422 does not correspond to graph data in the ground truth grid graphs 410, and the error correction model 130 changes the graph data to match the ground truth graph data. A first type of error can occur when graph data in the modified graphs 422 corresponds to graph data in the ground truth grid graphs 410, and the error correction model 130 changes the graph data. A second type of error can occur when graph data in the modified graphs 422 does not correspond to graph data in the ground truth grid graphs 410, and the error correction model 130 fails to change the graph data. A third type of error can occur when graph data in the modified graphs 422 does not correspond to graph data in the ground truth grid graphs 410, and the error correction model 130 changes the data incorrectly. For example, the error correction model 130 may change node data or edge data from one incorrect value to another incorrect value.

Parameters of the error-correcting model can be adjusted based on comparing the output graphs to the ground truth graphs. For example, the adjuster 440 can adjust model parameters 442 based on the total error 432. Model parameters can include, for example, configuration variables, neural network weights, support vectors, and coefficients of the model. By adjusting the model parameters based on the total error 432, the error correction model 130 can be trained to accurately replace erroneous data with accurate data in graphs of the electric grid.

In some examples, the model parameters 442 can be adjusted using a loss function such as a focal loss function. A focal loss function can be implemented in order to bias the training towards failed training examples. Focal loss is a dynamically scaled loss, where the scaling factor decays to zero as confidence in the correct output increases. The scaling factor can automatically down-weight the contribution of easy examples during training and focus the model on hard examples.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are represented in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A method comprising:

obtaining a virtual model of an electric grid, the virtual model representing a portion of the electric grid, the virtual model including nodes and edges between nodes, wherein:

each node represents a component of the electric grid and is associated with respective electrical properties of the component of the electric grid, and each edge represents a connection between components of the electric grid and is associated with respective electrical properties of the connection;

simulating operation of the portion of the electric grid as represented by the virtual model using an electric grid simulator to obtain simulation results including simulated time-varying characteristics of electrical characteristics of the components of the electric grid and the connections between the components of the electric grid;

identifying, using the simulation results, at least one error in the virtual model;

correcting errors in the virtual model, including processing both the virtual model and information identifying the at least one error with an error-correcting model comprising one or more machine learning models to obtain a corrected version of the virtual model, wherein correcting the errors in the virtual model comprises at least one of: adding an edge between nodes, replacing an edge between nodes, or removing an edge between nodes of the virtual model; and verifying accuracy of the corrected version of the virtual model by simulating operation of the portion of the electric grid as represented by the corrected version of the virtual model using the electric grid simulator.

2. The method of claim 1, wherein the at least one error comprises erroneous node data or erroneous edge data, the method comprising:

replacing the erroneous edge data, the erroneous node data, or both, with replacement values.

3. The method of claim 1, wherein the at least one error comprises erroneous node data or erroneous edge data, the method comprising:

appending the erroneous edge data, the erroneous node data, or both, with flag values.

4. The method of claim 1, comprising:

obtaining a first error report indicating edges and nodes where the at least one error is indicated in the simulation results.

5. The method of claim 4, wherein verifying the accuracy of the corrected version of the virtual model comprises:

obtaining a second error report indicating edges and nodes where errors are indicated in simulation results for the corrected version of the virtual model; and comparing the second error report to the first error report.

6. The method of claim 5, wherein comparing the second error report to the first error report comprises:

identifying an edge or node indicated by the first error report as including an error; and determining that the identified edge or node does not include an error in the second error report.

7. The method of claim 5, wherein verifying the accuracy of the corrected version of the virtual model comprises:

determining that a difference between a number of errors indicated by the second error report and a number of errors indicated by the first error report is a threshold difference or greater.

8. The method of claim 1, wherein verifying the accuracy of the corrected version of the virtual model comprises:

obtaining an error report indicating edges and nodes where errors are indicated in simulation results for the corrected version of the virtual model; and determining that a number of errors indicated by the error report is a threshold number of errors or less.

9. The method of claim 1, wherein:

each edge is associated with a binary signal, each bit of the binary signal representing a phase of the connection represented by the edge, and the at least one error in the virtual model comprises a binary signal for a first edge that does not match a binary signal of a second edge that is connected to the first edge by a node.

10. The method of claim 1, wherein the at least one error in the virtual model includes a discontinuity in which node data for a first node represents a first number of phases of a particular component of the electric grid and edge data for a first edge represents a second number of phases of a particular electrical connection that is connected to the particular component of the electric grid, the first number of phases being different from the second number of phases.

11. The method of claim 1, wherein the at least a portion of the electric grid comprises a feeder of the electric grid.

12. The method of claim 1, wherein an error of the at least one error in the virtual model comprises one of a phase island, a voltage mismatch, a missing substation, a missing primary voltage, or a missing secondary voltage.

13. The method of claim 12, wherein a phase island comprises one of a dead phase, a single-phase island, or a three-phase island, a dead phase comprising a phase for which no path of the virtual model connects the phase to an electric grid substation.

14. The method of claim 1, wherein the error-correcting model comprises a graph neural network model.

15. The method of claim 1, wherein the error-correcting model is configured to process the virtual model in a first format, the method comprising:

prior to inputting the virtual model to the error-correcting model, converting the virtual model from a second format to the first format.

16. The method of claim 15, wherein the first format comprises a graph tensor format and the second format comprises a grid graph format.

17. The method of claim 1, wherein the at least one error comprises a connectivity error in the virtual model.

18. The method of claim 1, wherein the virtual model is executable by the electric grid simulator to simulate the operation of the portion of the electric grid.

19. One or more non-transitory computer-readable media storing instructions that, when executed by one or more computers, cause the one or more computers to perform operations comprising:

obtaining a virtual model of an electric grid, the virtual model representing a portion of the electric grid, the virtual model including nodes and edges between nodes, wherein:

each node represents a component of the electric grid and is associated with respective electrical properties of the component of the electric grid, and each edge represents a connection between components of the electric grid and is associated with respective electrical properties of the connection;

simulating operation of the portion of the electric grid as represented by the virtual model using an electric grid simulator to obtain simulation results including simulated time-varying characteristics of electrical characteristics of the components of the electric grid and the connections between the components of the electric grid;

identifying, using the simulation results, indicating at least one error in the virtual model;

correcting errors in the virtual model, including processing both the virtual model and information identifying the at least one error with an error-correcting model comprising one or more machine learning models to obtain a corrected version of the virtual model, wherein correcting the errors in the virtual model comprises at least one of: adding an edge between nodes, replacing an edge between nodes, or removing an edge between nodes of the virtual model; and verifying accuracy of the corrected version of the virtual model by simulating operation of the portion of the electric grid as represented by the corrected version of the virtual model using the electric grid simulator.

20. A system comprising one or more computers and one or more storage devices storing instructions that when executed by the one or more computers cause the one or more computers to perform operations comprising:

obtaining a virtual model of an electric grid, the virtual model representing a portion of the electric grid, the virtual model including nodes and edges between nodes, wherein:

each node represents a component of the electric grid and is associated with respective electrical properties of the component of the electric grid, and each edge represents a connection between components of the electric grid and is associated with respective electrical properties of the connection;

simulating operation of the portion of the electric grid as represented by the virtual model using an electric grid simulator to obtain simulation results including simulated time-varying characteristics of electrical characteristics of the components of the electric grid and the connections between the components of the electric grid identifying, using the simulation results, at least one error in the virtual model;

correcting errors in the virtual model, including processing both the virtual model and information identifying the at least one error with an error-correcting model comprising one or more machine learning models to obtain a corrected version of the virtual model, wherein correcting the errors in the virtual model comprises at least one of: adding an edge between nodes, replacing an edge between nodes, or removing an edge between nodes of the virtual model; and verifying accuracy of the corrected version of the virtual model by simulating operation of the portion of the electric grid as represented by the corrected version of the virtual model using the electric grid simulator.

* * * * *